Feb. 4, 1964  N. S. POTTER ETAL  3,120,578
ORIENTATION DETERMINING DEVICE
Filed Sept. 23, 1960  3 Sheets-Sheet 1
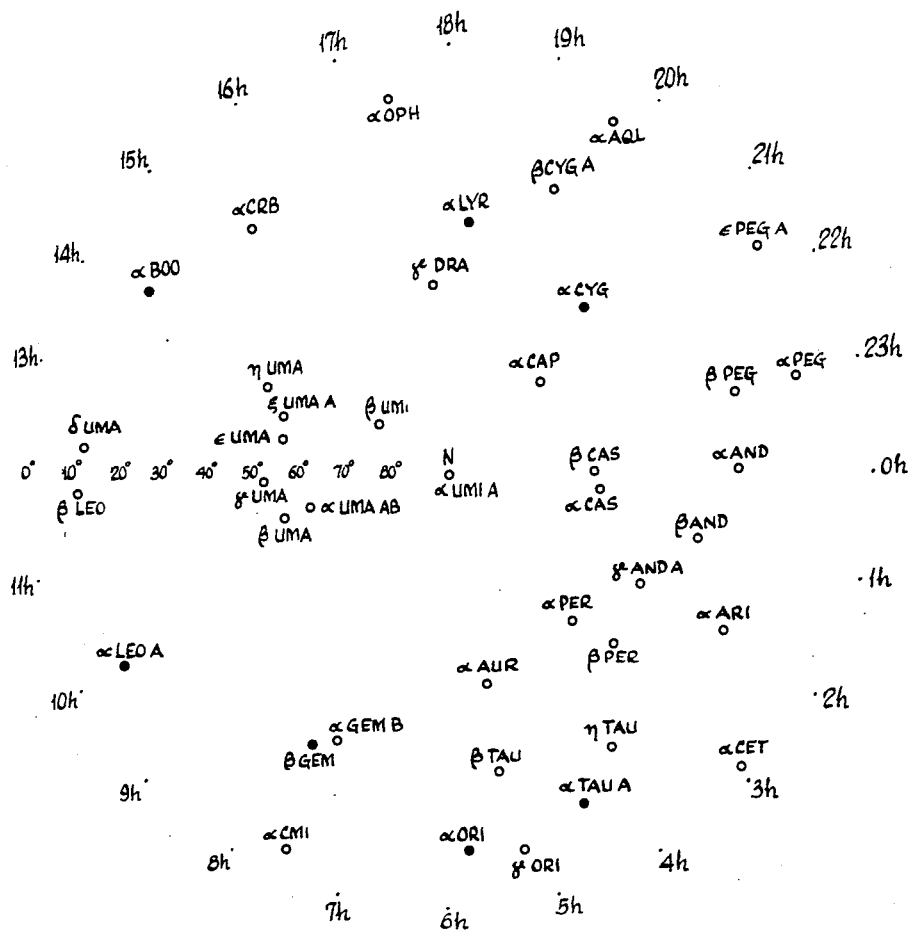
INVENTORS
NORMAN S. POTTER
ALFRED JORYSZ
BY
Nolte & Nolte
ATTORNEYS

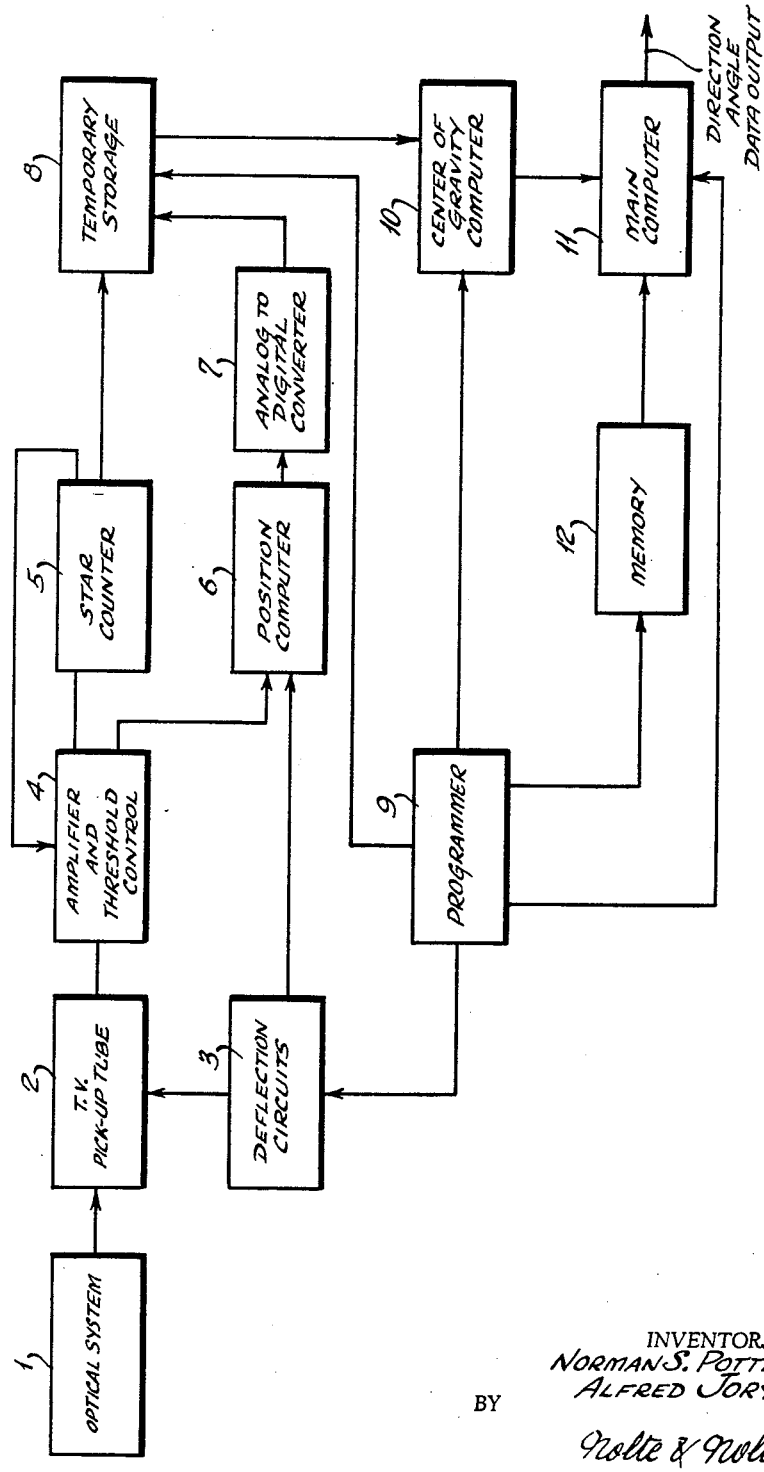

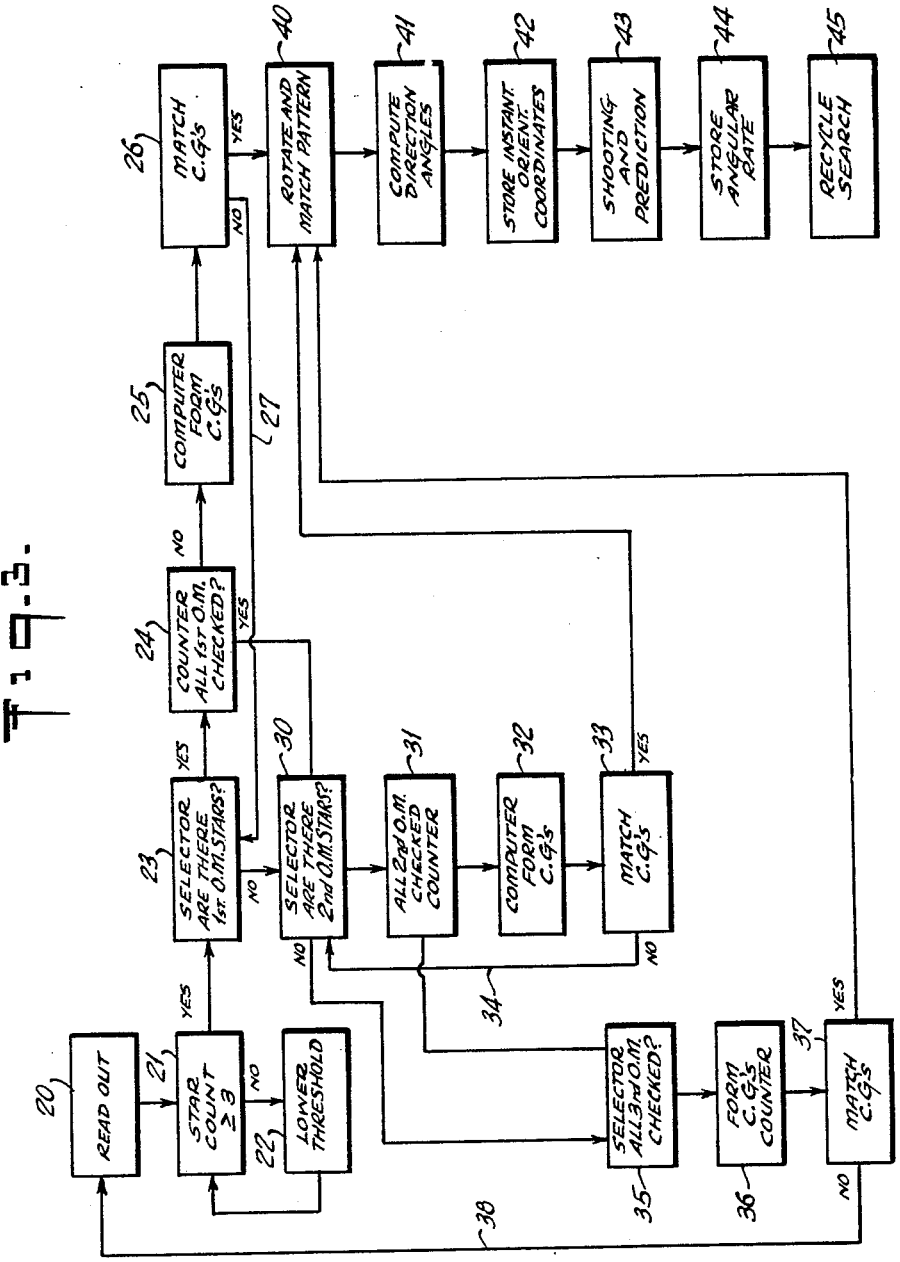

United States Patent Office 3,120,578
Patented Feb. 4, 1964

3,120,578
ORIENTATION DETERMINING DEVICE
Norman S. Potter, New York, and Alfred Jorysz, Brooklyn, N.Y., assignors to Maxson Electronics Corporation, a corporation of New York
Filed Sept. 23, 1959, Ser. No. 58,021
6 Claims. (Cl. 178—6.8)

The present invention relates to the determination of observer orientation in inertial space by observations of discrete star clusters.

The invention concerns a system for determining observer orientation in space by matching the momentarily observed sector of the celestial sphere with the corresponding star clusters stored within a system memory for identification of the direction of sight. Orientation may be completely determined by computing the angles with respect to an arbitrary preselected set of coordinates required for superimposing the stored and observed patterns.

According to the invention an optical system is used to focus an image of a section of the celestial sphere upon the light sensitive surface of a television type pick-up tube. The total number of stars which will appear will be a function of the size of the field of view and the setting of the brightness threshold of the pick-up tube. It can be shown that by measuring the angles between an observer within the solar system and three individual stars, a line of position can be established. The field of view, therefore, must contain a minimum of three stars. A television type scan is used preferably to provide relative cartesian coordinate data for each star in terms of the scan time, assuming that a rectangular screen is used and one corner of it is considered the origin of the coordinates. A computer is then provided to compute from the coordinate data the center of gravity of the observed star position. The center of gravity is then compared with the stored centroids of the star clusters in the memory. After a preliminary match has been obtained between a center of gravity and a stored centroid, computation of the desired orientation may be accomplished by establishing coincidence between the stored and the computed patterns through rotation about the geometric center of gravity. Failure to obtain a match or coincidence results in selecting another stored pattern with the correct star count or other identifying feature followed by the initiation of another matching process. The data obtained during the matching operation, in conjunction with the pre-stored data for each star configuration, permit computation of the angles which define the orientation of the observer in space.

An object of the invention is to determine the orientation of a space vehicle by substantially instantaneous observation of the celestial sphere so that the determination can be made independently of the prior history of observation and despite the tumbling of the vehicle.

Another object of the invention is to provide a system of orientation sensing in which the received information is essentially noiseless and errorless and which does not require continuous operation, but may remain quiescent until observations are needed.

The invention will be fully understood from the following description and the drawing in which:

FIG. 1 is a star map of a portion of the celestial sphere;

FIG. 2 is a block diagram of one embodiment of the system according to the invention; and FIG. 3 is a more detailed block diagram of a portion of the apparatus of the system.

FIG. 1 shows a simplified star map of the Northern Hemisphere. The Southern Hemisphere, which is characterized by somewhat reduced star densities, displays similar properties. In those areas where additional information is needed, third order magnitude stars are used. Referring to FIG. 2, an optical system 1 focuses a sector of the celestial sphere upon the light sensitive mosaic of a television type image pick-up tube 2. Deflection circuits 3 supply the necessary signals to carry out a television type scanning in tube 2. The output of a pickup tube 2 is connected to an amplifier 4 which contains an automatic threshold adjustment to permit selection of stars above certain brightness levels. After proper signal shaping in amplifier circuit 4 the output thereof is supplied to a counter 5 which establishes the total number of stars within a selected brightness range appearing within the view of camera tube 2. The output of the star counter 5 controls the threshold of amplifier 4 in a manner which will be explained in greater detail in connection with FIG. 3. The star count is then supplied to a temporary storage device 8. The star signals from amplifier 4 are also supplied to a position computer 6 along with the deflection voltages so that the magnitude of the deflection voltages or current at the instant of each star signal output of tube 2 provide coordinate information for each star image immediately during each scan. Position computer 6 is therefore capable of measuring the position of a star image with respect to a predetermined point or origin on the television pick-up tube screen. This information may then be transposed by an analog-to-digital converter 7 and the resultant digital information supplied to the temporary storage device 8. Reference is made here to the Handbook of Automation, Computation and Control, by E. M. Grabbe, S. Ramo and D. Wooldridge, vol. 2, chapter 19, published by J. Wiley, 1959, where a number of applicable storage techniques are described in detail. Various analog-to-digital converter designs appear in chapter 20 of the same reference as well as in A. K. Susskind, Notes on Analog-Digital Conversion Techniques, J. Wiley, 1958.

The storage and read out of information from the temporary storage device 8 is controlled by a programmer 9 which also synchronizes the deflection circuits 3. The programmer provides the facility for all logical operations and decisions which the computer portion of the orientation sensor must perform. Typical programmer designs are given in the above mentioned handbook in chapter 17 and in M. Phister, Jr., Logical Design of Digital Computers, J. Wiley, 1958.

As will be explained in greater detail in connection with FIG. 3, the number of stars which are usually viewed are three. This star information is sent from the storage device 8 to a computer 10, which determines from the coordinate information supplied by position computer 6, the center of gravity or the centroid of the cluster of three stars under view. The computer 10 is also sequenced by the programmer 9. The computed center of gravity is then supplied to a main computer which compares the computed center of gravity with the individual star reference data which is stored in a memory 12 and is supplied to the main computer 11 under control of the programmer 9. Memory 12 pre-stores selected star reference data needed for making the computations for all parts of the celestial sphere. Each centroid stored in memory 12 corresponds to a particular orientation. The relative geometric positions of the stars may be considered substantially invariant for most operating conditions of the device. A standard reference source for such preselected star position data is "The Atlas of the Heavens," by Antonin Becvar, 1958 edition.

The read-out portion 20 of television pick-up tube 2 supplies information to the star counting and threshold adjusting apparatus 4 and 5 of FIG. 1. Read-out circuit 20, FIG. 3, thus supplies signals to the star counter 21.

If less than three star signals are counted a signal N (No) is supplied to a threshold lowering circuit 22 which lowers the threshold of the star counter and amplifier 21 to admit a greater number of signals. If circuit 21 counts three or more stars a signal is sent in the Y (Yes) direction to the first order magnitude star selector 23. This circuit may be arranged so that if a first order magnitude star is present the signals will proceed to the right to a counting circuit 24 which sequentially selects all first order magnitude stars. If there is at least one such star the triad made up of the first order magnitude star and two of its neighbors is transmitted to the center of gravity computer 25 and the center of gravity data is then supplied to the main or matching computer 26, which compares this signal with the signals received from the reference data memory circuit 12 of FIG. 1. Thus the matching circuit 26 compares the computed center of gravity signal with the center of gravity signals of the memorized first order magnitude stars and as many of their neighbor pairs as are within a certain distance from the first magnitude stars. This distance is related to the maximum possible range between two stars appearing simultaneously within the field of view. If no match can be obtained with respect to one first order magnitude star, the next first order magnitude star is selected and the counter 24 is changed again by a signal sent over line 27 to the selector 23 and the matching process is repeated for all possible centers of gravity. It is thus possible to go through all first order magnitude stars, approximately twenty altogether, by just repeating this cycle. After the last star of first order magnitude has been checked, counter 24 becomes empty and a signal is sent to circuit 30 to place the latter in operation.

The second order and third order magntude star signals are then transmitted to circuit 30. If there are second order magnitude stars their signals are then transmitted to circuit 31. The center of gravity for triad consisting of each second order magnitude star and two of its neighboring stars is computed in circuit 32 and then matched against the reference signals from the memory in circuit 33 in the same manner as done in circuit 26 for the first order magnitude stars. If there are no second order magnitude star signals or after all second order magnitude star signals have been checked and consequently a signal has been sent over line 34, third order magnitude star signals are transmitted from circuit 30 to circuit 35 which again selects triads of stars and feeds them to a center of gravity computer 36 and the center of gravity data are then supplied to a matching circuit 37, similar to the circuits 26 and 33 previously described. If no match is obtained in the circuit 37 a signal is sent back over line 38 to the readout circuit 20 to initiate a new search recognition cycle. None of the three loops of the first order, second order and third order magnitude stars would be operated endlessly since a terminating signal is supplied in each group at the end of a matching sequence. Matching circuits 26, 33 and 37, if they find a match, transmit a signal to a circuit which may rotate the matched star pattern to bring it into coincidence with the stored memory pattern. The output of circuit 40 may then be processed in a suitable computer 41 for computing the direction angles.

The individual blocks of FIG. 3 are actually sections of the programmer 9, center of gravity computer 10 and the main computer 11, which are shown in FIG. 2. They have been depicted in some detail in FIG. 3 in order to illustrate the logical data flow more clearly. Both computers may be combined into a special purpose digital data processing machine, the design of which may be based on standard principles, as outlined in chapter 18 of the above cited handbook reference. The individual center of gravity computations, to be performed by blocks 25, 32 and 36, may be carried out by a single computing section by applying the well known technique of multiplexing. A similar approach may be used in executing the computations indicated by blocks 26, 33 and 37.

In brief, the specific data-handling of the output of the sensory apparatus is subject to many variations, dependent upon the nature of the computing apparatus that may be available on board the using vehicle. Considerations of economy in weight, cost, and complexity, frequently suggest the multiple use of available equipments whenever possible. Since, in many areas of application, an appropriate computer will be available or, if not, can be readily provided as a state of the art device for which only known design techniques are required, disclosure of a special purpose computer to accomplish the required tasks is not necessary.

The system enables the vehicle tumbling rate to be determined. For this purpose the instantaneous orientation data from angle computer 41 are fed to storage apparatus 42. The latter is connected to a computer 43, 44 for smoothing the discrete positional data and deriving the angular rate of tumbling of the vehicle. The technology of smoothing discretely derived positional data is well known, and constitutes a problem which can be handled by any computer of adequate memory and bandwidth. Fnally, the system is provided with means 45 for starting a new search cycle.

In another form of representative data-handling logic, the required preselected "permanent" information which would be stored would consist of the squares of angular separations of selected star pairs used as a geometric invariant under rotation, and the angular position coordinates. The member stars are chosen from among those of first, second, and third magnitude, and distributed in such a manner across the celestial sphere that at least three would be visible in any optical field of view. Analysis of the celestial distributions has shown that this is possible with rectangular fields of the order of 30° x 30°.

Due to inherent motion, certain of the stars exhibit a small displacement over an extended time interval, which is predictable. Two means of correction are possible.

The system may periodically compute the revised coordinates and angular separations or, alternately, the system may be programmed to call upon a storage block containing the corrected data to replace the older information when it is no longer applicable. Alternately, in the special case of a satellite system that may operate for a lengthy period of time in the reasonable environs of the earth, if there is provision for appropriate communications with the vehicle, revised memory inputs may be transmitted to it for insertion while in orbit.

Numerous storage configurations, such as that discussed above, are obvious and readily implementable, the optimal choice being a function of the mission of the carrying vehicle and the nature of its subsystems, including the computing and communications facilities, and the subsequent data handling logic. The latter is, in turn, dependent upon special requirements relating to the admissible processing time delays and equipment characteristics such as the computer bandwidth and program storage capacity.

With respect to the preceding memory configuration, the scanning system would read out the observed rectangular coordinates and form the squares of the separations. The memory would then be searched sequentially in terms of increasing magnitude. Following the location of a stored star pair with separation that, to an admissible error, approximates that of the observed pair, a tentative identification would be made and the coordinates of the members read out. Another pair comprising one of the stars already processed and another of the observed group, would then be formed and the memory search process continued. An advantage of using a previously processed star is that the subsequently identified pair would have to have a communal member with its predecessor pair, providing thereby a much needed check upon the identification process, made necessary by scanning inaccuracies and quantization information losses.

While only one embodiment has been illustrated, it is apparent that the invention is not limited to the exact form and use shown and that many variations may be made in the particular design and configuration without departing from the scope of the invention as set forth in the appended claims.

We claim:

1. A system for determining observer orientation in inertial space, comprising a television camera tube having a light sensitive surface, optical means for projecting a section of the celestial sphere on the light sensitive surface of said tube, deflection voltage generating circuits connected to said tube, an output circuit connected to said tube including a star counting circuit and a threshold control means responsive to said star counting circuit for limiting the signals produced by individual stars to a predetermined number, position computing means connected to the deflection circuits and the output of the camera tube for computing the positions of the observed stars with respect to a fixed origin on the light sensitive surface of the tube, means connected to said position computer for computing the relative geometric positions between said individual star signals, memory means for storing preselected star position data, means for composing said relative geometric positions of the observed stars with successive outputs of said memory means, and means for programming the memory means, the relative geometric position computer, and the comparing means.

2. A system for determining observer orientation in inertial space, comprising a tube having a light sensitive surface, optical means for projecting a section of the celestial sphere on the light sensitive surface of said tube, deflection voltage generating circuits connected to said tube, a star counting circuit connected to the output of said tube, an amplifier including threshold control means responsive to said start counting circuit for limiting the star signals to a predetermined number, position computing means connected to the deflection circuits and the output of said tube for computing the positions of the observed stars with respect to a fixed origin on the light sensitive surface of the tube, means connected to said position computer for computing the relative geometric positions between said star signals, memory means for storing preselected star position data, means for comparing said relative geometric positions of the observed stars with the outputs of said memory means.

3. A system for determining observer orientation in inertial space comprising a television type camera tube having a light sensitive surface, optical means for projecting a section of the celestial sphere on the light sensitive surface of said tube, deflection voltage generating circuits connected to said tube, a star counting circuit connected to the output of said tube, means connected to the output of said tube for selecting a fixed number of star signals therefrom, position computing means connected to the deflection circuits and the output of the camera tube for computing the positions of the observed stars with respect to a fixed origin on the light sensitive surface of the tube, memory means for storing preselected star position data, means for comparing the positions of the selected observed stars with the outputs of the memory, and means for programming the memory, the computer, and the comparing means.

4. A system for determining observer orientation in inertial space comprising a television type camera tube having a light sensitive surface, optical means for projecting a section of the celestial sphere on the light sensitive surface of said tube, deflection voltage generating circuits connected to said tube, a star counting circuit connected to the output of said tube, threshold control means responsive to said star counting circuit for adjusting the output of said tube to select a predetermined number of the brightest stars, memory means for storing preselected star position data, means for comparing relative locations of the observed stars and the outputs of the memory means and means for programming the memory means and the comparing means.

5. A system for determining observer orientation in inertial space comprising a television camera tube having a light sensitive surface, optical means for projecting a section of the celestial sphere on the light sensitive surface of said tube, deflection voltage generating circuits connected to said tube, a star counting circuit connected to the output of said tube, an amplifier including threshold control means responsive to said star counting circuit for adjusting the output of said amplifier to select a predetermined number of stars, position computing means connected to the output of said amplifier for computing the relative positions of said selected stars, memory means for storing preselected star position data, means for comparing the positions of the observed stars with the outputs of the memory, and means for programming the memory, the position computer, and the comparing means.

6. A system for determining observer orientation in inertial space, comprising a tube having a light sensitive surface, optical means for projecting a section of the celestial sphere on the light sensitive surface of said tube, deflection voltage generating circuits connected to said tube, a star counting circuit connected to the output of said tube, an amplifier including threshold control means responsive to said star counting circuit for limiting the star signals to a predetermined number, position computing means connected to the deflection circuits and the output of said tube for computing the positions of the observed stars with respect to a fixed origin on the light sensitive surface of the tube, means connected to said position computer for computing the relative geometric positions between said star signals, memory means for storing preselected star position data, means for comparing said relative geometric positions of the observed stars with the outputs of said memory means to derive discrete instantaneous positional data, and computer means responsive to said discrete positional data for determining the vehicle tumbling rate.

References Cited in the file of this patent

UNITED STATES PATENTS

| | | |
|---|---|---|
| 3,043,907 | Martin | July 10, 1962 |
| 3,048,352 | Hansen | Aug. 7, 1962 |